United States Patent [19]
Lipsey

[11] Patent Number: 5,972,696
[45] Date of Patent: Oct. 26, 1999

[54] COMPOST PILE BUILDING APPARATUS

[76] Inventor: William T. Lipsey, 207 E. Percy, Indianola, Miss. 38751

[21] Appl. No.: 07/925,615

[22] Filed: Aug. 6, 1992

[51] Int. Cl.[6] ................................................. C05F 17/02
[52] U.S. Cl. .................................... 435/290.4; 435/290.1; 19/48 R; 198/508
[58] Field of Search ............................ 455/287, 290, 455/305, 307, 313, 315, 316; 422/184; 71/8, 9, 901; 405/128, 129; 241/DIG. 38; 423/DIG. 18; 198/508, 631; 414/133, 308, 309, 310, 301, 302; 19/39, 48 R; 435/290.1, 290.2, 290.4

[56] References Cited

U.S. PATENT DOCUMENTS

| | | | |
|---|---|---|---|
| 696,266 | 3/1902 | Piez et al. | 414/133 |
| 2,823,106 | 2/1958 | Pierson | 71/9 |
| 3,145,855 | 8/1964 | Plugge et al. | 414/302 |
| 3,298,749 | 1/1967 | Croon et al. | 302/56 |
| 3,438,584 | 4/1969 | Klein | 239/651 |
| 3,438,740 | 4/1969 | Brown | 23/259.1 |
| 4,164,405 | 8/1979 | Pinckard | 71/24 |
| 4,172,518 | 10/1979 | Grayson | 198/631 |
| 4,213,724 | 7/1980 | Holderness | 414/133 |
| 4,253,405 | 3/1981 | Cottrell et al. | 110/222 |
| 4,288,241 | 9/1981 | Shelef | 71/9 |
| 4,445,814 | 5/1984 | Malmstrom et al. | 414/295 |
| 4,629,060 | 12/1986 | Schlegel et al. | 198/508 |
| 4,952,230 | 8/1990 | Norlund | 71/9 |

FOREIGN PATENT DOCUMENTS

| | | | |
|---|---|---|---|
| 1597354 | 9/1981 | United Kingdom | 71/9 |

*Primary Examiner*—William H. Beisner
*Attorney, Agent, or Firm*—Walker, McKenzie & Walker, PC

[57] ABSTRACT

An apparatus and method for using cotton gin trash or the like to build a compost pile. The apparatus includes a support surface for supporting a compost pile with at least a portion of the support surface being porous; a conveyor for conveying compostable material along a path above the support surface and for dispensing the compostable material onto the support surface; and a mechanism for adding a fluid to the compostable material as the compostable material is received in the inlet of the conveyor.

6 Claims, 3 Drawing Sheets

FIG. 2
FIG. 3
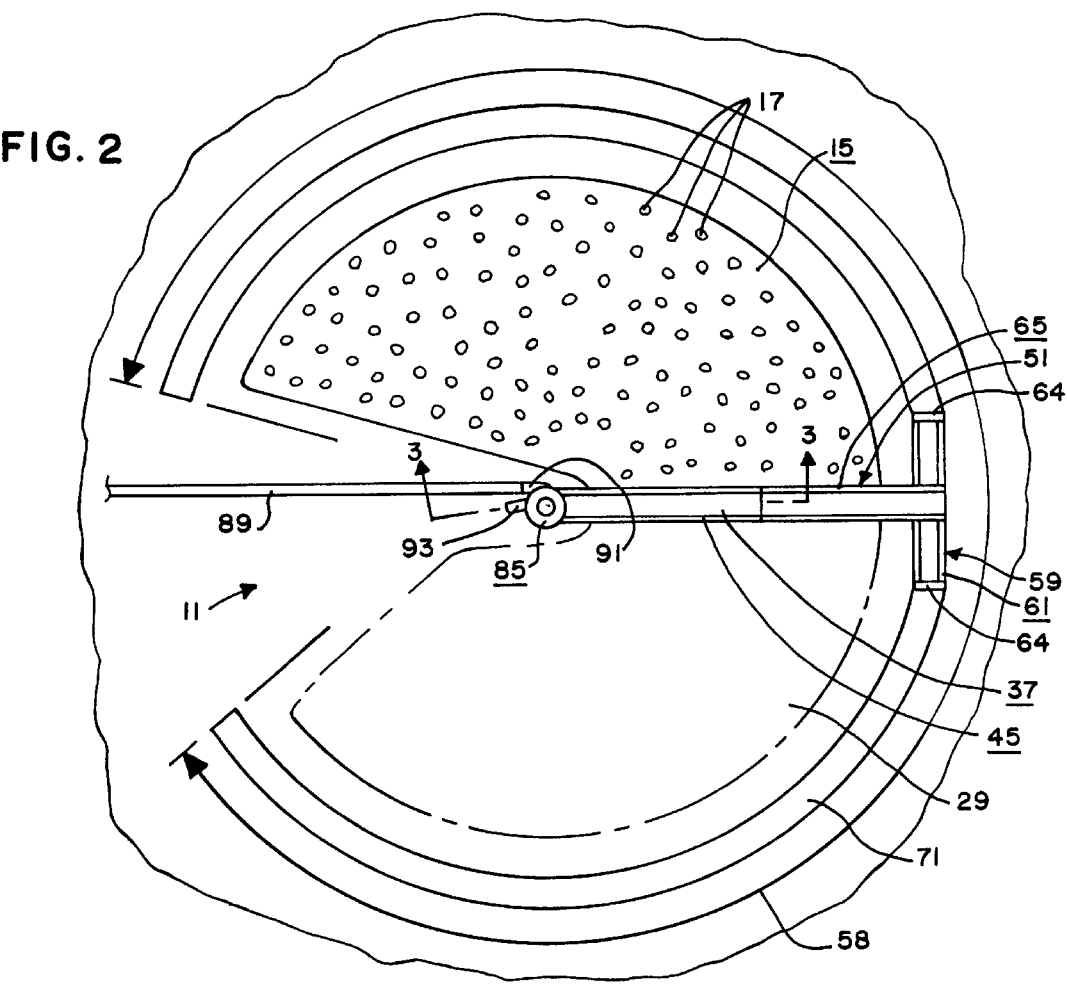
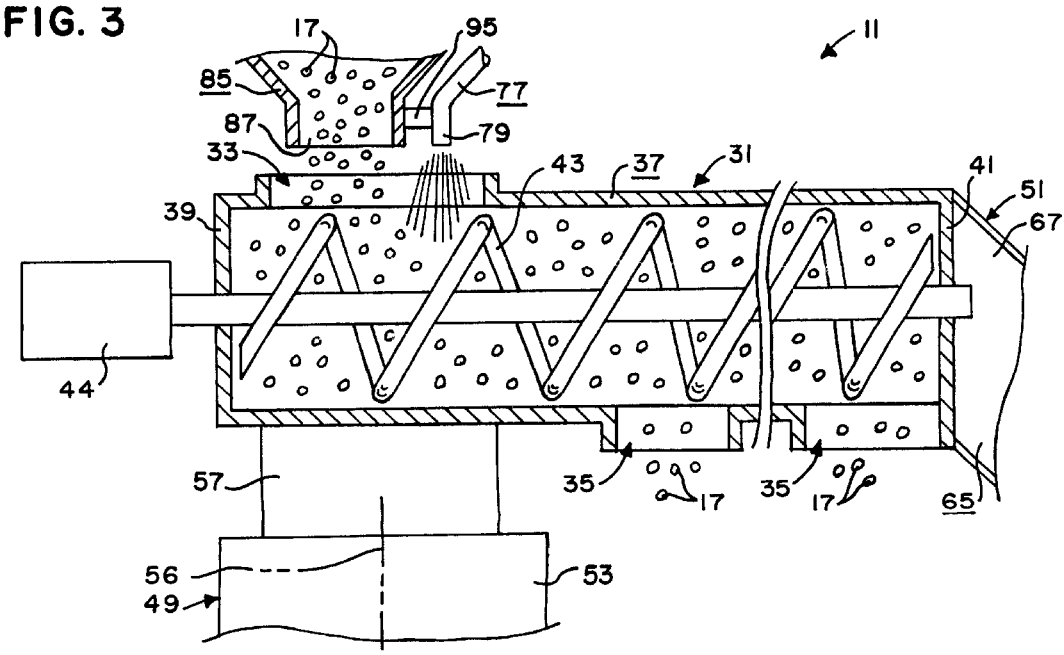

COMPOST PILE BUILDING APPARATUS

BACKGROUND OF THE INVENTION

1. Field of the Invention

The present invention relates, in general, to an apparatus and method for building a compost pile, and more specifically to an apparatus and method for use in combination with a cotton gin to build a compost pile with cotton gin trash.

2. Description of the Related Art

Many devices have heretofore been developed for piling particulate materials such as wood chips, seeds, slag, coal, gravel, waste materials and the like in substantially conical piles. A typical such device may include a screw conveyor having an inlet at one end and an outlet at the other end with the screw conveyor swingably mounted on a support so that the material will fall from the outlet of the conveyor to form a conical pile when the conveyor is stationary, or a ring or segment of a ring with a conical vertical cross-section when the conveyor is swung about in a substantially horizontal plane on the support.

A preliminary patentability search has been conducted in class 406, subclasses 56 and 173; class 414, subclasses 132 and 133; and class 198, subclass 508.

Croon et al., U.S. Pat. No. 3,298,749, issued Jan. 17, 1967, discloses an apparatus having a discharge conveyor mounted on a carriage that is pivotally movable about a vertical axis for discharging wood chips onto one end of an interrupted ring-shaped pile of wood chips with the center of the ring-shaped pile of wood chips located at the vertical axis, and having a removal conveyor mounted second carriage that is also pivotally movable about the vertical axis for removing wood chips from the other end of the pile of wood chips.

Klein, U.S. Pat. No. 3,438,584, issued Apr. 15, 1969, discloses a composting device that includes a vehicle having an auger that works, turns and lifts rows of matter while the vehicle is driven through the matter. The auger directs the matter toward the center thereof and thereafter lifts the matter whereupon a conveying means receives the matter from the auger and thereafter feeds the matter to a spreader which selectively guides the matter so it can be piled as it originally was prior to being worked.

Brown, U.S. Pat. No. 3,438,740, issued Apr. 15, 1969, discloses a composting conveyor movable along an elongated tank for periodically agitating organic material placed in the tank for aerobic digestion. The conveyor is inclined and operable in a gap of the material to progressively elevate the material adjacent the lower portion of the conveyor to a position above the level of the material in the tank and discharge it back into the tank.

Grayson, U.S. Pat. No. 4,172,518, issued Oct. 30, 1979, discloses a radial stacker adapted to dispense aggregate material to form a stack. The radial stacker includes a conveyor for dispensing the aggregate material and for moving horizontally and vertically through a plurality of dispensing positions to form the stack. One end of the conveyor is supported at a fixed pivot so that it is capable of traversing a horizontal arc of up to 340 degrees.

Holderness, U.S. Pat. No. 4,213,724, issued Jul. 22, 1980, discloses a conveyor apparatus for stacking and distributing comminuted material. The conveyor apparatus includes a fixed first support, a second support supported by the first support and capable of rotation about a vertically extending axis, an arm secured to the second support and concomitantly rotatable with the second support, a rotating mechanism for rotating the second support about the rotational axis, a first pulley secured to one end of the arm, a second pulley secured to the arm between the second support and the end of the arm opposite the first pulley, an endless conveyor belt around the first and second pulleys, support elements along the arm to support the conveyor belt, an actuating mechanism for driving the conveyor belt about the first and second pulleys, a plow supported by the arm having a plow blade above and in proximity to the conveyor belt, and a reversible winch for moving the plow along the arm.

Malmstrom et al., U.S. Pat. No. 4,445,814, issued May 1, 1984, discloses an apparatus for depositing solid particulate material in a frustoconical pile. The apparatus includes a substantially horizontally arranged screw conveyor for receiving and transporting particulate material therealong, and means for feeding particulate material to an inlet end of the screw conveyor. The screw conveyor is designed so that the particulate material is discharged from a initial discharge point until the level of the pile of particulate material rises to the screw conveyor. The particulate material is then conveyed farther along the length of the screw conveyor, thereby leveling off the top of the pile and causing the pile to form a frustoconical shape.

Schlegel et al., U.S. Pat. No. 4,629,060, issued Dec. 16, 1986, discloses an apparatus for handling bulk material located in a pile at a storage site. The apparatus includes a stationary support column that is anchored at the lowermost end thereof. The support column supports a stacker device at the uppermost end thereof. The stacker device is mounted for rotating movement relative to the support column for stacking the material at the storage site in a substantially circular array. A material feed device is mounted over the stacker device and feeds the material thereto during the stacking operation. A reclaimer device is mounted for rotary movement relative to the support column and for reclaiming the material from the pile to transfer the material to a discharge area.

The safe, legal, and cost-efficient disposal of by-products of certain manufacturing and agricultural processes has been a long-existing problem in many industries. For example, the disposal of the by-products of cotton ginning operations has been a problem for many years and has in recent years been the subject of increasingly stringent state and federal regulations.

A typical commercial cotton gin now commonly consists of a large building having an inlet port for receiving un-ginned cotton from trucks, etc. The un-ginned cotton is subjected to a first ginning step for removing certain trash (e.g., sticks, twigs, leaves, and the like) from the cotton. This trash (commonly referred to as "gin trash" or "cotton gin trash") is currently disposed of in one of three basic methods.

In one method, the gin trash is merely blown through a pipe to an exterior location and allowed to form a pile of gin trash. However, because of the nature of the gin trash, a large amount of "dust" and the like is created as the gin trash is blown onto the pile. Such "dust" normally contains chemical pollutants from the various agricultural sprays and the like which have been applied to the cotton prior to harvesting, etc. In addition, due to the heat created when such gin trash starts to decompose in the piles, many, if not most, such piles will be subject to spontaneous combustion, and will emit pollutants due to the burning thereof and from the various agricultural chemicals that may be present in the gin trash. Such burning piles are extremely difficult to extinguish.

In a second method, the gin trash is merely blown into or otherwise loaded onto trailers which are used to haul the gin trash to an off-site disposal area. Dust and the like is also created with this method when the gin trash is blown into the trailers, etc., and also when the filled trailers are moved to the off-site disposal area, and the problem of spontaneous combustion is merely moved to an off-site disposal area. Further, this method adds transportation costs, etc., to the disposal costs.

In a third method, the gin trash is blown from the gin to an incinerator for burning. This method also creates dust and the like when the gin trash is blown into the incinerator, and adds incineration costs, to the disposal costs. Further, the burning of the gin trash creates additional pollution and regulatory problems.

None of the above identified patents or prior art discloses or suggests the present invention. More specifically, none of the above identified patents or prior art discloses or suggests a compost pile building apparatus or method including conveyor means for conveying compostable material along a path above a support surface and for dispensing the compostable material onto a porous portion of the support surface; and means for wetting the compostable material as the compostable material is deposited into the inlet of the conveyor means.

SUMMARY OF THE INVENTION

The present invention is directed toward providing an improved apparatus and method of building a compost pile. The concept of the present invention is to discharge material to be composted onto a support surface in a substantially conical pile while simultaneously wetting or dampening the material being discharged onto the compost pile to both reduce or eliminate any dust that might otherwise be created as the material is discharged onto the compost pile, and to reduce or eliminate any possibility that the compost pile might ignite due to spontaneous combustion.

One object of the present invention is to provide an apparatus and method for composting cotton gin trash.

Another object of the present invention is to provide such an apparatus and method that is not labor intensive.

Another object of the present invention is to provide such an apparatus and method that takes no labor to operate so that it does not take away from cotton gin managers' valuable time.

Another object of the present invention is to eliminate ongoing trucking or hauling of cotton gin trash during ginning season.

Another object of the present invention is to provide such an apparatus and method that can turn cotton gin trash into a valuable asset. More specifically, one object of the present invention is to turn cotton gin trash into valuable compost that can be applied to agricultural fields, etc.

Another object of the present invention is to provide such an apparatus and method that will cause cotton gin trash to generate sufficient heat as it composts to destroy unwanted grass seeds, etc., while preventing the composting trash from igniting due to spontaneous combustion so that the composted cotton gin trash can be applied back to the agricultural fields to improve yields.

Another object of the present invention is to provide such an apparatus and method that wets the cotton gin trash to control dust.

Another object of the present invention is to allow the freedom of waiting until after the ginning season is over to apply the gin trash to the fields. This means that one can wait until the fields are dry before applying the composted gin trash thereto.

Another object of the present invention is to provide such an apparatus that is durable, that has very few moving parts, and that requires very little maintenance and service.

The apparatus of the present invention comprises, in general, conveyor means for conveying compostable material along a path above a support surface and for dispensing the compostable material onto a porous portion of the support surface; the conveyor means having an inlet for receiving the compostable material from a source of compostable material, and having a plurality of spaced outlet ports for dispensing the compostable material along a path across at least a portion of the support surface; and means for wetting the compostable material as the compostable material is deposited into the inlet of the conveyor means.

The method of the present invention comprises, in general, the steps of wetting compostable material as the compostable material is deposited into the inlet of a conveyor means; conveying the wetted compostable material along a path above a support surface; and dispensing the wetted compostable material onto a porous portion of the support surface as it is conveyed along the path above the support surface.

BRIEF DESCRIPTION OF THE DRAWINGS

FIG. 2 is a top plan view of the apparatus of the present invention with portions thereof broken away for clarity.

FIG. 3 is a sectional view substantially as taken on line 3—3 of FIG. 2 with a somewhat enlarged scale and with portions thereof omitted and broken away for clarity.

DESCRIPTION OF THE PREFERRED EMBODIMENT

Figure 1:
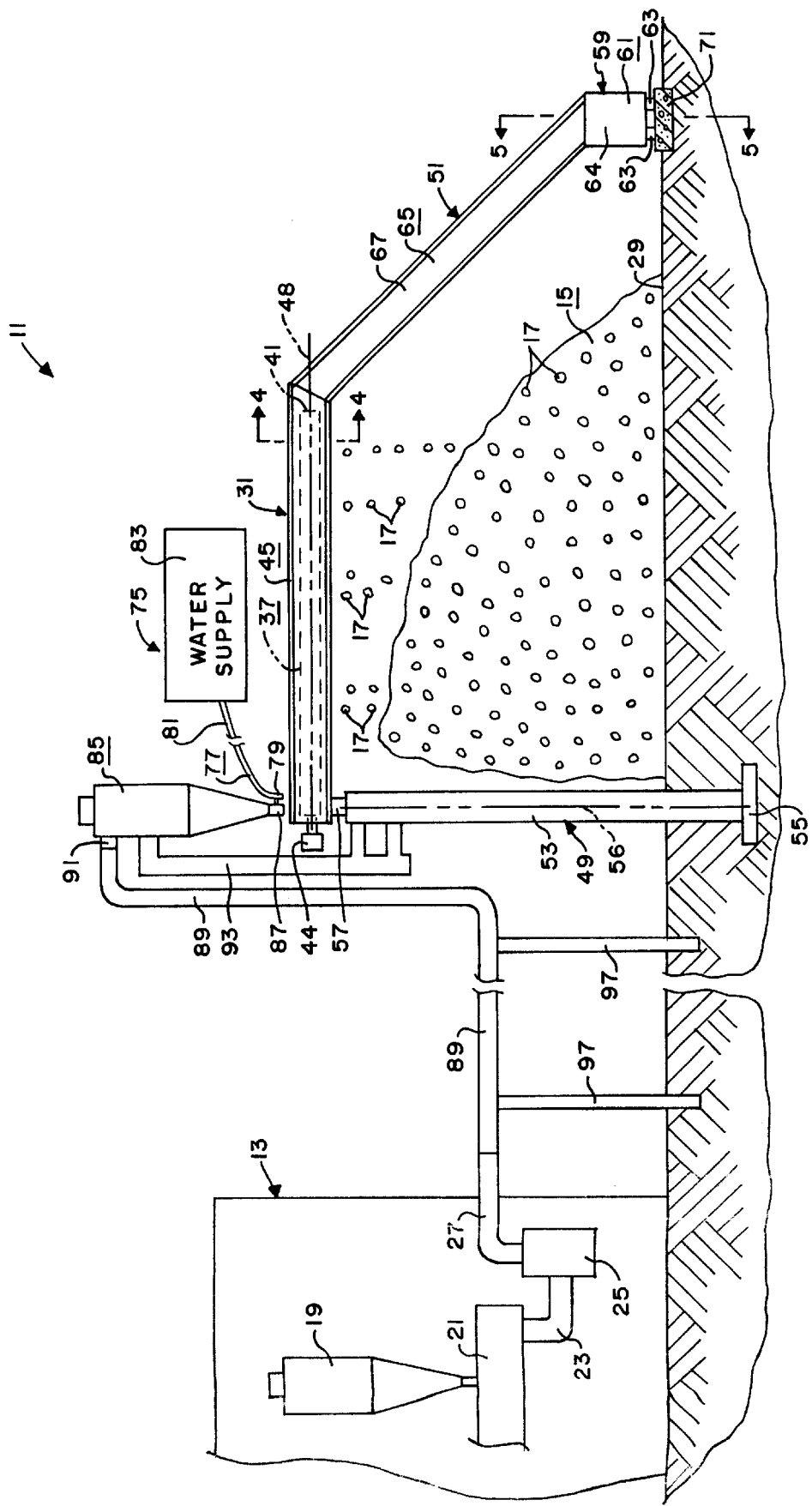
FIG. 1 is a somewhat diagrammatic side elevational view of the apparatus of the present invention shown in combination with a cotton gin and a compost pile, with portions thereof broken away for clarity.
Figure 4:
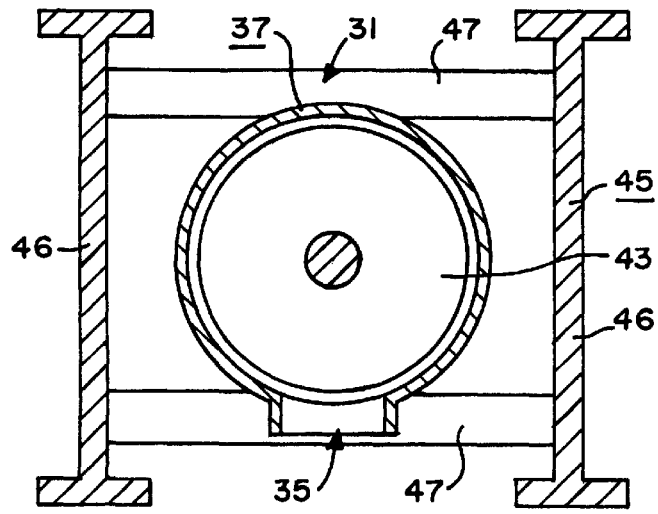
FIG. 4 is a sectional view substantially as taken on line 4—4 of FIG. 1 with a somewhat enlarged scale and with portions thereof omitted for clarity.

The preferred embodiment of the apparatus of the present invention is shown in FIGS. 1–5, and identified by the numeral 11. The apparatus 11 is especially designed for use in combination with a typical cotton gin 13 to build a compost pile 15 from the cotton gin trash 17 removed from harvested cotton by the cotton gin 13. It will be appreciated by those skilled in the art that present day mechanical cotton harvesting means and methods produce substantial quantities of such cotton gin trash 17. Thus, for example, each bale of spindle-picked lint cotton might produce from 100 to 150 pounds of cotton gin trash 17, while stripper-harvested cotton might produce 5 to 10 times as much cotton gin trash 17.

Portions of a typical, present day cotton gin 13 are shown diagrammatically in FIG. 1. Such a cotton gin 13 typically includes a plurality of cyclones 19 (only one of which is shown in FIG. 1) for separating gin trash 17 from air after such gin trash 17 has been separated from the cotton by other portions (not shown) of the cotton gin 13 as will now be apparent to those skilled in the art. The gin trash 17 from the cyclones 19 is deposited into a manifold 21 and then pulled from the manifold 21 through a conduit 23 by a fan 25. The fan 25 is typically capable of removing 6000 cubic feet of air per minute from the manifold 21 to thus maintain a negative pressure within the manifold 21, etc., in a manner and for reasons which will now be apparent to those skilled in the art. The fan 25 typically blows the gin trash 17 from the cotton gin 13 through an outlet pipe 27 for disposal, etc.

The apparatus 11 includes a support surface 29 for supporting the compost pile 15. At least a portion of the support surface 29 is preferably porous for allowing water, etc., to drain from the compost pile 15, etc. More specifically, the support surface 29 preferably consists of dirt. That is, the apparatus 11 is preferably constructed so that the compost pile 15 can be constructed directly on top of an area of ground adjacent the cotton gin 13 or the like.

The apparatus 11 includes conveyor means 31 for conveying compostable material, i.e., the gin trash 17, along a path above the support surface 29 and for dispensing the gin trash 17 onto the support surface 29. As shown generally in FIG. 3, the conveyor means 31 has an inlet 33 for receiving the gin trash 17 from a source of gin trash 17 (e.g., from the outlet pipe 27 of a cotton gin 13), and has a plurality of spaced outlet ports 35 for dispensing the gin trash 17 along a path across at least a portion of the support surface 29. The conveyor means 31 preferably consists of a typical screw-type auger including an elongated, hollow tube-like body 37 having a first end 39 and a second end 41, and including a rotating screw 43 mounted within the hollow body 37 for causing the gin trash 17 to move from the first end 39 of the body 37 toward the second end 41 thereof. The conveyor means 31 preferably includes a motor 44 for rotatably driving the screw 43. The motor 44 is preferably a typical 15 H.P. electric motor or the like as will now be apparent to those skilled in the art.

The conveyor means 31 preferably includes a structural frame means 45 for supporting and reinforcing the auger. The specific construction and design of the structural frame means 45 may vary as will now be apparent to those skilled in the art. Thus, the structural frame means 45 may be constructed from metal I-beam members 46 extending along each side of the body 37 of the auger, and cross members 47 rigidly connecting the body 37 of the auger and the I-beam members 46 together (see, for example, FIG. 4). The I-beam members 45 may, in turn, be constructed from light weight structural members, welded or otherwise fixedly attached to one another to form a rigid, lightweight structure as will now be apparent to those skilled in the art. The structural frame means 45 may also include a walkway and the like secured to the I-beam members 46 for allowing easy maintenance of the auger, etc., as will now be apparent to those skilled in the art.

The conveyor means 31 is preferably positioned so that the longitudinal axis 48 of the body 37 and screw 43 of the auger are substantially parallel to and spaced above the support surface 29. Thus, the conveyor means 31 is preferably positioned so that the longitudinal axis of the body 37 and screw 43 of the auger are substantially horizontal. The apparatus 11 preferably includes a first support means 49 for supporting the first end 39 of the body 37 of the auger approximately 30 feet (9.1 meters) or so above the support surface 29, and a second support means 51 for supporting the second end 41 of the body 37 of the auger approximately 30 feet (9.1 meters) or so above the support surface 29.

The first support means 49 preferably includes a concrete tower or post 53 rigidly mounted to the support surface 29 in such a manner that the top of the post 53 is approximately 30 feet (9.1 meters) above the support surface 29. The bottom of the post 53 may be placed 6 feet (1.8 meters) into the ground on a concrete slab 55 to insure the stability thereof. The post 53 is preferably arranged substantially vertical so that the longitudinal axis thereof will form a vertical axis 56. By constructing the post 53 out of concrete rather than wood, iron, steel or the like, any deterioration thereof that might otherwise be caused by the compost pile 15 will be reduced or prevented.

The conveyor means 31 is preferably pivotally attached to the first support means 49. More specifically, the first support means 49 may include pivot means 57 or the like for being positioned between the top of the concrete post 53 and the first end 39 of the body 37 of the auger of the conveyor means 31 or an adjacent portion of the structural frame means 45, and for allowing the conveyor means 31 to pivot about the vertical axis 56 as will now be apparent to those skilled in the art. The pivot means 57 is preferably capable of allowing the conveyor means 31 to pivot approximately 288 degrees about the vertical axis 56 as indicated by the arrow 58 in FIG. 2. The specific construction of the pivot means 57 may vary as will now be apparent to those skilled in the art. The pivotal design of the conveyor means 31 reduces the cost of the apparatus 11 by reducing the length of the conveyor means 31 required to handle a certain volume of gin trash 17. More specifically, a conveyor means required to build a straight compost pile of a certain volume would have to be longer, and thus more expensive to construct and operate, than a similar conveyor means for building a semi-circular or ring-shaped compost pile of the same volume.

The second support means 51 preferably includes trolley means 59 for being rollably supported on the ground adjacent the support surface 29. The trolley means 51 preferably includes a body member 61 rollably supported by a plurality of wheels 63 or the like. The body member 61 may be constructed in various manners and designs, and out of various materials as will now be apparent to those skilled in the art. Thus, for example, the body member 61 may be constructed out of rigid metal structural members welded or otherwise joined to one another to form a rigid box-like skeleton or frame with the wheels 63 rollably joined to the bottom thereof by axles or the like. The opposite ends of the body member 61 are preferably reinforced to form bumpers 64 for reasons which will hereinafter become apparent.

The second support means 51 preferably includes a support arm means 65 or the like for extending between the body member 61 of the trolley means 59 and the second end 41 of the body 37 of the auger of the conveyor means 31 to thereby support the conveyor means 31 through the wheels 63. The specific construction and design of the support arm means 65 may vary as will now be apparent to those skilled in the art. The support arm means 65 may be constructed similar to the structural frame means 45. Thus, the support arm means 65 may include a pair of spaced apart metal I-beam members 67 rigidly joined together by cross members 69, etc., and may also include a stairway and the like secured to the I-beam members 67 for allowing easy maintenance, as will now be apparent to those skilled in the art.

Figure 5:
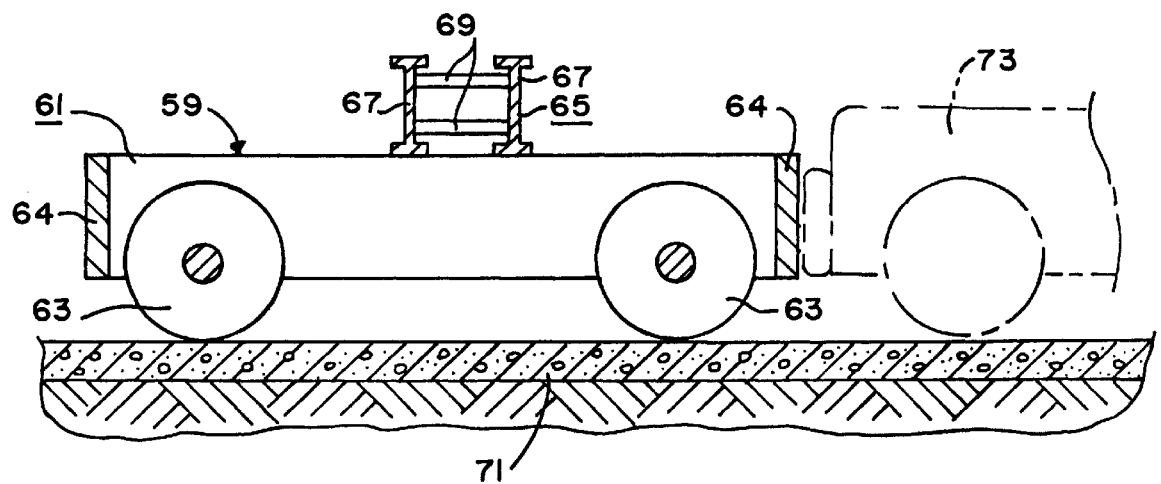
FIG. 5 is a sectional view substantially as taken on line 5—5 of FIG. 1 with a somewhat enlarged scale and with portions thereof omitted and broken away for clarity.

The apparatus 11 preferably includes a substantially circular track 71 extending about the support surface 29 for providing a rigid supporting path for the trolley member 59, etc. The track 71 is preferably constructed from concrete or the like to form a strong, smooth supporting surface for the wheels 63 of the trolley member 59 and to allow the trolley member 59 to be moved in a substantially circular path about the post 53 whereby the conveyor means 31 can be pivoted about the vertical axis 56 via the pivot means 57 approximately 288 degrees as indicated by the arrow 58 in FIG. 2. A typical cotton gin yard tractor 73 or the like may be used to push the trolley means 59 along the track 71 as shown in FIG. 5.

The apparatus 11 includes means for wetting the gin trash 17 as the gin trash 17 is deposited into the inlet 33 of the conveyor means 31. The means for wetting preferably includes fluid means 75 for adding a fluid such as water to the gin trash 17 as the gin trash 17 is received in or deposited into the inlet 33 of the conveyor means 31. The fluid means 75 preferably includes a hose 77 having a first or outlet end 79 for being positioned so as to direct fluid passing therefrom into the inlet 33 of the conveyor means 31, and having a second or inlet end 81 for being coupled to a pressurized water supply 83 such as the output of a typical water pump, community water supply, or the like.

The apparatus 11 preferably includes a cyclone 85 having a discharge port 87 positioned directly above the inlet 33 of the conveyor means 31 and directly above the pivot point of the conveyor means 31 (i.e., directly above the vertical axis 56). An inlet pipe 89 may extend from the discharge end of the outlet pipe 27 of the cotton gin 13 to the inlet port 91 of the cyclone 85. The cyclone 85 is preferably of typical construction and operation, and may be secured to the post 53 of the first support means 49 directly above the inlet 33 of the conveyor means 31 by appropriate brace means 93 and the like as will now be apparent to those skilled in the art. The hose 77 of the fluid means 75 may be fixed to the cyclone 85 by an appropriate brace 95 or the like so as to direct the discharge from the outlet end 79 of the hose 77 into the inlet 33 of the conveyor means 31. Appropriate brace means 97 may be provided between the support surface 29 and the inlet pipe 89 for properly supporting the inlet pipe 89 as will now be apparent to those skilled in the art.

The method of the present invention includes, in general, the steps of wetting the compostable material (i.e., the gin trash 17) as the gin trash 17 is deposited into the inlet 33 of the conveyor means 31; conveying the wetted gin trash 17 along a path above the support surface 29; and dispensing the wetted gin trash 17 onto a porous portion of the support surface 29 as the wetted gin trash 17 is conveyed along the path above the support surface 29. The method preferably includes the additional step of pivoting the conveyor means 31 about the vertical axis 56 as the compost pile 15 is formed so that the compost pile 15 will be built along a partially circular path about the vertical axis 56 as will now be apparent to those skilled in the art.

As thus constructed and used, the present invention provides an apparatus and method for using cotton gin trash or the like that is economical to build and use, and that is environmentally friendly, etc.

Although the present invention has been described and illustrated with respect to a preferred embodiment and a preferred use therefor, it is not to be so limited since modifications and changes can be made therein which are within the full intended scope of the invention.

I claim:

1. In combination, a cotton gin having a discharge port for discharging cotton gin trash in a forced air stream, and an apparatus for building a compost pile from said cotton gin trash, said apparatus comprising:

a) a support surface for supporting said compost pile, said support surface having a porous dirt portion;

b) a support post extending upward from substantially the center of said support surface;

c) a cyclone attached to said support post for separating said cotton gin trash being discharged from said discharge port of said cotton gin from said forced air stream, said cyclone having an inlet port coupled to said discharge port of said cotton gin for receiving said cotton gin trash from said discharge port of said cotton gin, said cyclone having an outlet port for discharging said cotton gin trash after said cotton gin trash has been separated from said forced air stream;

d) conveyor means for conveying said cotton gin trash along a path above said support surface and for dispensing said cotton gin trash onto said porous dirt portion of said support surface; said conveyor means having an inlet for receiving said cotton gin trash from said outlet port of said cyclone, and having a plurality of spaced outlet ports for dispensing said cotton gin trash along a path across at least a portion of said support surface; and e) fluid means for adding a fluid to said cotton gin trash as said cotton gin trash is received in said inlet of said conveyor means.

2. The combination of claim 1 in which said conveyor means includes a screw auger for moving said cotton gin trash from said inlet to said outlet ports of said conveyor means.

3. The combination of claim 2 in which is included trolley support means for movably supporting said conveyor means and for allowing said conveyor means to pivot about a substantially horizontal plane above said support surface.

4. The combination of claim 3 in which said conveyor means has a first end and a second end; in which said, support post pivotally supports said first end of said conveyor means for allowing said conveyor means to pivot about a substantially horizontal plane above said support surface; and in which said trolley support means supports said second end of said conveyor means.

5. The combination of claim 3 in which said trolley support means includes a trolley means for being rollably supported on a support surface; in which said trolley support means includes arm means extending between said second end of said conveyor means and said trolley means.

6. An apparatus for receiving cotton gin trash from a discharge member of a cotton gin, and for using said cotton gin trash to build a compost pile; said apparatus comprising:

a) a generally circular support surface for supporting a compost pile, at least a portion of said support surface being porous;

b) a generally circular track extending around the perimeter of said support surface;

c) a cyclone for separating said cotton gin trash from forced air, said cyclone having an inlet port for receiving said cotton gin trash from said discharge member of said cotton gin, said cyclone having an outlet port for discharging said cotton gin trash after said cotton gin trash is separated from the forced air;

d) conveyor means for conveying said cotton gin trash along a path above said support surface and for dispensing said cotton gin trash onto said support surface; said conveyor means having a first end and a second end; said conveyor means including an inlet located adjacent said first end thereof for receiving the cotton gin trash from said outlet port of said cyclone; said conveyor means including a plurality of spaced outlet ports located between said first and second ends thereof for dispensing said cotton gin trash along a path across at least a portion of said support surface; said conveyor means including a screw auger for moving said cotton gin trash from said inlet to said outlet ports;

d) spray means for spraying a fluid onto said cotton gin trash as said cotton gin trash is received in said inlet of said conveyor means; and e) support means for supporting said conveyor means a spaced distance above said support surface; said support means including tower support means for pivotally supporting said first end of said conveyor means and for allowing said conveyor means to pivot about a substantially horizontal plane above said support surface; said support means including trolley support means for movably supporting said second end of said conveyor means and for allowing said conveyor means to pivot about a substantially horizontal plane above said support surface; said trolley support means including a trolley means for being rollably supported on said track; in which said trolley support means includes arm means extending between said second end of said conveyor means and said trolley means.

* * * * *